No. 788,120. PATENTED APR. 25, 1905.
G. W. THOMAS.
PRESS FOR PLASTIC MATERIAL.
APPLICATION FILED JULY 21, 1904.

2 SHEETS—SHEET 2.

WITNESSES
F. W. Wright.
Walter Abb.

INVENTOR
George W. Thomas
BY
Howson and Howson
ATTORNEYS

No. 788,120.   Patented April 25, 1905.

UNITED STATES PATENT OFFICE.

GEORGE W. THOMAS, OF EAST LIVERPOOL, OHIO, ASSIGNOR TO THE R. THOMAS AND SONS COMPANY, OF EAST LIVERPOOL, OHIO, A CORPORATION OF OHIO.

PRESS FOR PLASTIC MATERIAL.

SPECIFICATION forming part of Letters Patent No. 788,120, dated April 25, 1905.

Application filed July 21, 1904. Serial No. 217,556.

*To all whom it may concern:*

Be it known that I, GEORGE W. THOMAS, a citizen of the United States of America, residing in East Liverpool, in the county of Columbiana, State of Ohio, have invented an Improved Press for Plastic Material, of which the following is a specification.

My invention relates to presses constructed for operating on clay and like plastic material, and more particularly to presses for forming clay into proper shapes for the production of porcelain insulators in which bell or cup shaped parts are molded with threads in the bottom of the bell or cup for the reception of the threaded supporting-pins.

The object of my invention is to so construct the apparatus as to facilitate and simplify the work and to improve the product.

Figure 1:
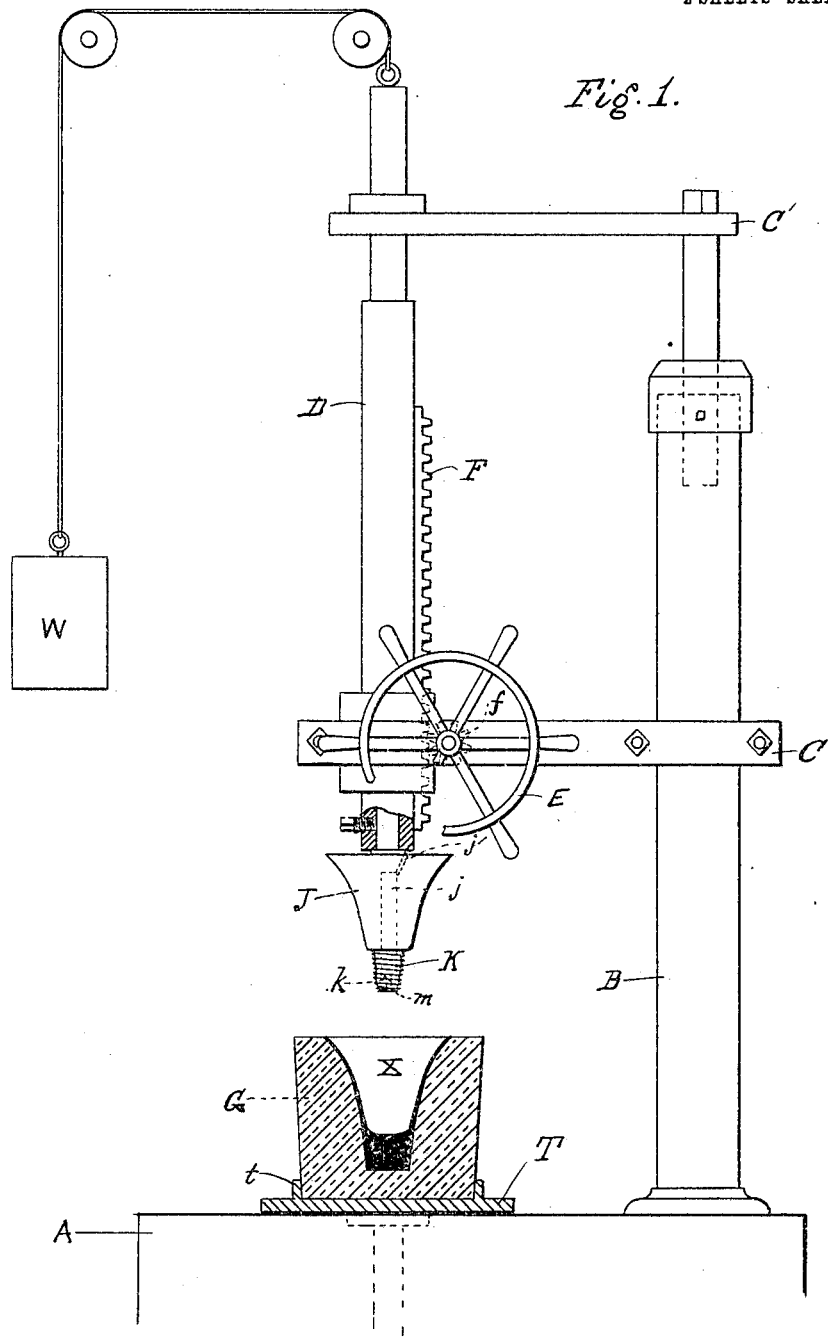
Figure 2:
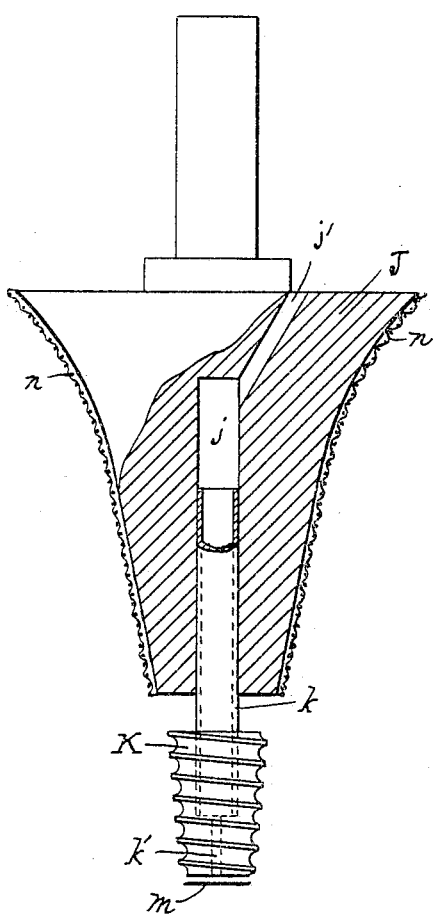
Figure 3:
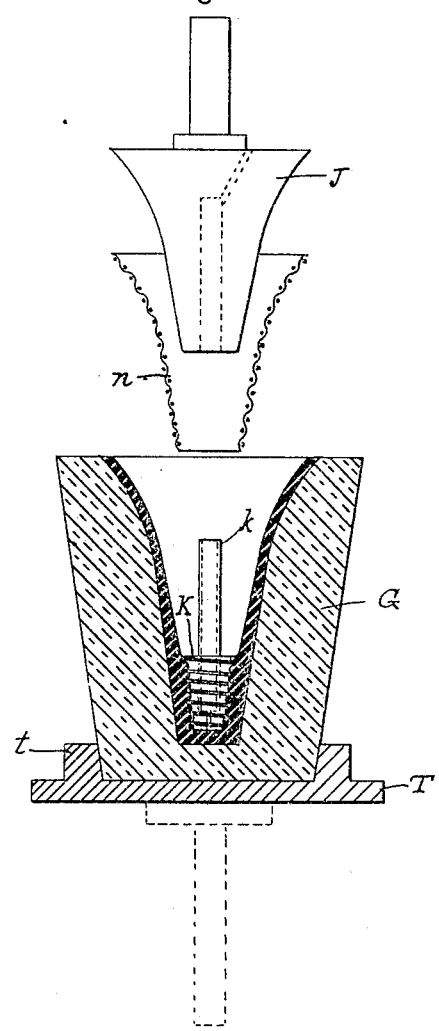

In the accompanying drawings, Figure 1 is a side elevation, partly in section, of the complete press with the parts in the positions where the forming-mandrel is about to be pressed into the clay in the mold. Fig. 2 is a view, on an enlarged scale, partly in section and showing the mold and mandrel parts; and Fig. 3 is a still larger view, partly in section, of the two-part mandrel.

The frame of the press may be of any suitable construction. In the drawings I have shown it as comprising a base A with a supporting-pillar B, which carries two vertically-adjustable guide-arms C and C'. In the outer ends of these arms is guided the plunger-spindle D, which carries at its lower end the forming-mandrel and has connected to its upper end a suitable counterweight W. A rack F on the spindle has geared to it a pinion $f$ on a shaft provided with a hand-wheel E, by turning which the spindle may be depressed to force the mandrel into the plastic clay in the mold G. This mold is preferably made of plaster and is mounted upon a table or "twirler" T, which can be conveniently rotated in the base A, such a twirler as is in common use in potteries, except that this twirler has an annular flange $t$ to support and hold the mold.

An important feature of my invention consists in the construction of the mandrel to form or shape the inside of the insulator-bell or other cup-shaped piece. I make this mandrel in two separable parts—one, J, the nonrotating body portion, and the other, K, the threaded terminal portion, separable from the body portion in the press. The body-piece J is to be secured by clamping-screws or otherwise to the lower end of the plunger-spindle D, Fig. 1, and has a central vertical opening $j$ from the bottom to near its top for the reception of the hollow spindle $k$ of the threaded portion K of the mandrel, Fig. 2. This opening $j$ has an air-inlet $j'$ at the top of the mandrel J, and the hollow interior of the spindle $k$ communicates with a small air-passage $k'$ to the extreme outer end of the threaded mandrel K, Fig. 2. In connection with this threaded portion of the mandrel I employ a disk $m$, Fig. 2, of paper or like combustible material, and in connection with the body portion J, I employ a tubular jacket $n$, Fig. 3, of woven fabric, such as cotton or linen, shaped to fit over the tapering walls of the mandrel, which would otherwise come into contact with the clay. This fabric jacket is of such length that when the mandrel has been depressed to its proper position within the mold the upper margin of the fabric jacket will be open to the air at the mouth of the mold, so that air has then access to the upper part of the fabric jacket between the mandrel and the clay, and consequently the moment the mandrel starts to withdraw the air can enter, permitting easy withdrawal of the mandrel.

In using the described construction the operator first places in the plaster mold a proper quantity of a clay, as indicated at X, Fig. 1. Then placing the jacket $n$ on the mandrel J and the detachable threaded mandrel-piece K into the mandrel J and providing a paper disk $m$ to close the outer end of the air-passage $k'$ the spindle D and two-part mandrel are forced downward into the clay in the mold without rotation. Then the spindle D is raised without rotation, carrying with it the attached part J of the mandrel, but leaving behind both the fabric jacket $n$ and the threaded part K of the mandrel. The presence of the fabric permits the body portion of the mandrel to easily withdraw from the molded clay, for the fabric permits air to enter as the mandrel starts to withdraw. The operator then picks the fabric jacket out of the molded clay, and then taking the spindle $k$ of the threaded mandrel in one hand he turns the twirler-table T, whose axis of rotation is the same as that of the threaded mandrel, with the other hand in a proper direction to screw the threaded mandrel K out of the molded clay, the air-vent permitting this. The paper disk which acted as a valve to close this air-vent during the pressing operation may be left in the clay cup to be burned in the kiln, or it may be picked out, if convenient.

The attached conical valves commonly employed in the ends of screw-mandrels have the objection that they are liable to choke up and fail to work properly, so that on withdrawing such screw-mandrel from the clay suction on the latter produces defects which in a finished product of the character of a high-tension insulator are of the most serious importance. The loose or separable disk valve which I employ avoids this difficulty entirely.

The usual practice in molding insulator-pieces has been to screw the whole mandrel into and out of the clay; but I have found that this rotary motion of the mandrel has an injurious action upon the structure of the clay. This I have avoided by making the main body of the mandrel non-rotating, as described.

I claim as my invention—

1. A press for plastic material, comprising a mold and a mandrel having a fabric jacket whose upper margin is open to the mouth of the mold when the mandrel has been pressed into the mold, whereby the withdrawal of the mandrel from the mold is facilitated.

2. A press for plastic material, comprising a plaster mold in combination with a mandrel having a fabric jacket whose upper margin is open to the mouth of the mold when the mandrel has been pressed into the mold, whereby the withdrawal of the mandrel from the mold is facilitated.

3. A press for plastic material, comprising a mold, in combination with a mandrel in two parts, a body portion and a terminal threaded portion separable from each other in the press, and a fabric jacket for the body portion adapted to facilitate the withdrawal of said body portion from the mold.

4. A press for plastic material, comprising a mold, in combination with a mandrel in two parts, consisting of a body portion having an air-vent and a terminal threaded portion also with an air-vent and separable from the body portion in the press.

5. A press for plastic material, comprising a mold in combination with a mandrel, having an air-vent and a separate disk detached from the mandrel to close the air-vent during the pressing operation.

6. A press for plastic material, comprising a mold, in combination with a mandrel having an air-vent and a disk of combustible material to close the air-vent during the pressing operation.

7. A press for plastic material, comprising a mold and a supporting twirler-table therefor, in combination with a mandrel having a screw-threaded part, the axis of rotation of the twirler and the screw-threaded part being the same, whereby withdrawal of the screw-threaded part from the mold is facilitated.

8. A press for plastic material, comprising a mold and a supporting twirler-table therefor in combination with a mandrel in two parts, one a body portion and the other a terminal threaded portion separable from the body portion in the press, the axis of rotation of the twirler and the terminal threaded portion being the same, whereby withdrawal of said threaded terminal portion is faciltated.

9. A press for plastic material, comprising a mold in combination with a mandrel in two parts, consisting of a non-rotating body portion having a fabric jacket adapted to facilitate the withdrawal of the said body portion from the mold, and a terminal threaded portion separable from the body portion in the press.

10. A press for plastic material, comprising a plaster mold in combination with a mandrel in two parts, consisting of a body portion having a fabric jacket for the purpose set forth, and a terminal threaded portion separable from the body portion in the press.

In testimony whereof I have signed my name to this specification in the presence of two subscribing witnesses.

GEORGE W. THOMAS.

Witnesses:
  H. R. HOLMES,
  B. D. KENNEY.